J. A. MULHERIN.
BATH SPRAY.
APPLICATION FILED MAR. 14, 1921.

1,422,291.　　　　　　　　　　Patented July 11, 1922.

Inventor:
James A. Mulherin,
By Hugh K. Wagner,
Attorney.

UNITED STATES PATENT OFFICE.

JAMES A. MULHERIN, OF ST. LOUIS, MISSOURI, ASSIGNOR OF ONE-THIRD TO HENRY D. DELKESKAMP, OF ST. LOUIS, MISSOURI.

BATH SPRAY.

1,422,291.  Specification of Letters Patent.  Patented July 11, 1922.

Application filed March 14, 1921. Serial No. 452,166.

*To all whom it may concern:*

Be it known that I, JAMES A. MULHERIN, a citizen of the United States, residing at the city of St. Louis, in the State of Missouri, have invented certain new and useful Improvements in Bath Sprays, of which the following is a specification.

This invention is a bath spray, and has for its object the elimination of metal parts and the making of it entirely of rubber or similar material, so as to prevent corrosion.

In the accompanying drawings forming part of this specification, in which like numbers of reference denote like parts wherever they occur, Figure 1 is a vertical sectional view;

Figure 1:
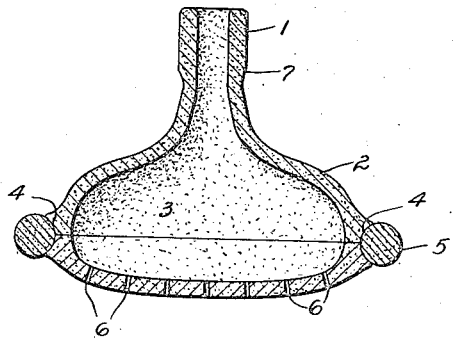
Figure 2:
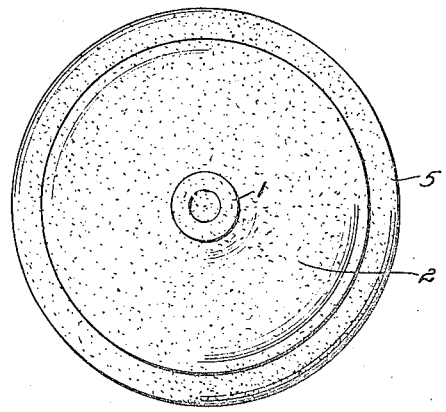
Figure 2 is a top plan view.
Figure 3:
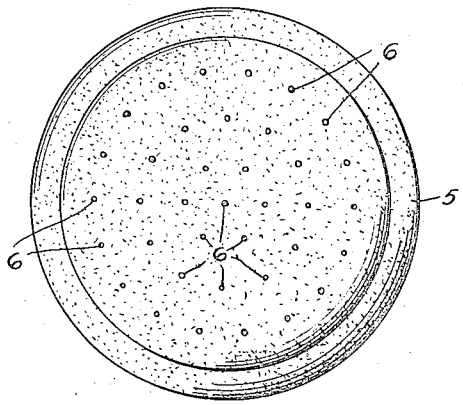
Figure 3 is a bottom plan view.

A water-supply tube (not shown in the drawings) leads to the nipple 1 of the spray head 2, where it is suitably connected, and water fills the cavity of hollow interior 3 of spray 2.

A circumferential groove 4 surrounds the spray head 2, and a hard and comparatively stiff rubber ring 5 fits and seats therein and thereby imparts rigidity to the spray as a whole, which it would not otherwise possess, because of the walls of spray 2 being flexible.

Nozzle holes 6 are provided in the outer wall of spray 2.

Nipple 1 is slightly thickened or reinforced.

Having thus described this invention, I hereby reserve the benefit of all changes in form, arrangement, order, or use of parts, as it is evident that many minor changes may be made therein without departing from the spirit of this invention or the scope of the following claims.

I claim:

1. A bath spray comprising a hollow head formed from soft rubber provided in its outer edge with a groove, and a ring of hard rubber detachably received in said groove and constituting a stiffening means for said head.

2. A bath spray comprising a flexible hollow head formed from soft non-rigid rubber, said head being provided with a continuous groove in its outer side, and a rigid ring composed solely of hard rubber received in said groove and constituting a stiffening means for the head whereby to retain the shape of the head and to form a gripping means, said head being provided with discharge means.

In testimony whereof I hereunto affix my signature.

JAMES A. MULHERIN.